(12) United States Patent
Eichelhard et al.

(10) Patent No.: US 10,046,809 B2
(45) Date of Patent: Aug. 14, 2018

(54) BODY COMPONENT FOR A MOTOR VEHICLE

(71) Applicant: GM GLOBAL TECHNOLOGY OPERATIONS LLC, Detroit, MI (US)

(72) Inventors: Oliver Eichelhard, Ruesselsheim (DE); Axel Wendorf, Ruesselsheim (DE); Sabrina Patschicke, Ruesselsheim (DE); Sebastian Buckert, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/449,860

(22) Filed: Mar. 3, 2017

(65) Prior Publication Data
US 2017/0253277 A1 Sep. 7, 2017

(30) Foreign Application Priority Data
Mar. 3, 2016 (DE) .................. 10 2016 002 634

(51) Int. Cl.
*B62D 25/20* (2006.01)
*B62D 27/02* (2006.01)
*B62D 29/00* (2006.01)

(52) U.S. Cl.
CPC ......... *B62D 25/20* (2013.01); *B62D 25/2036* (2013.01); *B62D 25/2045* (2013.01); *B62D 27/02* (2013.01); *B62D 29/007* (2013.01); *B60Y 2306/09* (2013.01)

(58) Field of Classification Search
CPC ...... B62D 25/20; B62D 29/007; B62D 27/02; B62D 25/2036; B62D 25/2045; B60Y 2306/09
USPC .......... 296/193.07, 204, 37.15, 37.2, 97.23, 296/187.08, 30
See application file for complete search history.

(56) References Cited

U.S. PATENT DOCUMENTS

| | | | | |
|---|---|---|---|---|
| 5,860,687 A | * | 1/1999 | Corporon | B62D 25/087 224/42.12 |
| 7,036,860 B1 | * | 5/2006 | McGuckin | B62D 43/10 296/193.07 |
| 7,540,559 B2 | | 6/2009 | Egawa et al. | |

(Continued)

FOREIGN PATENT DOCUMENTS

| | | |
|---|---|---|
| CN | 203793446 U | 8/2014 |
| DE | 102005030177 A1 | 6/2006 |

(Continued)

OTHER PUBLICATIONS

German Patent Office, German Search Report for German Patent Application No. 10 2016 002 634.0 dated Jan. 18, 2017.

(Continued)

*Primary Examiner* — Jason S Morrow
*Assistant Examiner* — E Turner Hicks
(74) *Attorney, Agent, or Firm* — Lorenz & Kopf, LLP

(57) ABSTRACT

A plate-shaped body component for a motor vehicle has a planar core zone, a planar edge zone and a first intermediate zone, which is set off from the core zone and from the edge zone by at least one step each. The core zone and the edge zone are deflected against the first intermediate zone in opposite directions of a surface normal of the first intermediate zones.

18 Claims, 2 Drawing Sheets

(56) References Cited

U.S. PATENT DOCUMENTS

| | | | |
|---|---|---|---|
| 8,007,031 B2 * | 8/2011 | Yasuhara | B62D 21/152 |
| | | | 296/187.11 |
| 8,186,735 B2 | 5/2012 | Maceri et al. | |
| 2011/0227367 A1 * | 9/2011 | Funakoshi | B62D 25/087 |
| | | | 296/187.11 |
| 2016/0305746 A1 * | 10/2016 | Rasico | F41H 7/042 |

FOREIGN PATENT DOCUMENTS

| | | |
|---|---|---|
| DE | 102007054146 A1 | 5/2009 |
| DE | 102010014515 A1 | 11/2010 |
| DE | 102010061157 A1 | 6/2012 |
| DE | 102011018951 A1 | 10/2012 |
| DE | 102013021403 A1 | 6/2015 |
| JP | 2002145124 A | 5/2002 |
| JP | 2014046876 A | 3/2014 |

OTHER PUBLICATIONS

Great Britain Patent Office, Great Britain Search Report for Great Britain Application No. GB1703209.5, dated Jul. 4, 2017.

* cited by examiner

BODY COMPONENT FOR A MOTOR VEHICLE

CROSS-REFERENCE TO RELATED APPLICATION

This application claims priority to German Patent Application No. 102016002634.0, filed Mar. 3, 2016, which is incorporated herein by reference in its entirety.

TECHNICAL FIELD

The present disclosure pertains to a body component for a motor vehicle, in particular a body component delimiting a passenger cell of the vehicle.

BACKGROUND

The body of a motor vehicle is excited into vibrations through the periodical movement of the engine which, when excessively transmitted to the passenger cell, result in a noise level there that may be disturbing to the occupants.

DE 10 2007 054 146 A1 proposes to influence the vibration behavior of the underbody of a motor vehicle by applying a sound deadening material. The effect of such a sound deadening material is based on mass inertia; its effectiveness consequently depends on an adequate quantity being applied. This conventional solution therefore not only causes an increase in material and production costs but also leads to an increase of the vehicle mass, which is undesirable since it increases the fuel consumption.

SUMMARY

The present disclosure provides a body component for a motor vehicle with which a reduction of the noise level in the passenger cell is possible without increasing the vehicle mass.

According to a configuration of the present disclosure, a panel-like body component for a motor vehicle includes a planar core zone, a planar edge zone and a first intermediate zone, which is set off from the core zone and from the edge zone by at least one step each. The core zone and the edge zone are deflected against the first intermediate zone in opposite directions of a surface normal of the first intermediate zone.

The word "planar" must not be understood as flat in the geometrical sense here; the steps are not planar, each of these includes two elongated regions which are greatly curved in opposite directions, of which one adjoins the intermediate zone. Thus, any region of the body component whose curvature radius is a multiple of the curvature radius of these elongated regions can be considered planar.

The present disclosure is based on the consideration that for preventing vibration in the passenger cell, it is not absolutely necessary to dampen an oscillating body component over a broad frequency band, but that it is sufficient to shift resonance frequencies of the body or of its parts by stiffening so that the overlap between the frequency regions of the engine vibration and the resonance frequencies of the body is reduced. In order to increase the resistance moment of a plate-shaped body component against bending vibrations, beads can be stamped into the body component. The higher the beads are, the more effective for increasing the resistance moment, but the height of the beads, which can be stamped into the metal sheets used in the body production without the risk of a tearing of the metal sheets, is limited.

The present disclosure solves this problem in that quasi a plurality of large beads are nested into one another one, which forms the intermediate zone, and a further one which forms the core zone within the intermediate zone, in order to overcome in this way the height limitation of the individual bead.

The body component should be stamped in one piece from sheet metal. Although the intermediate zone could also extend over a joint between two metal sheets, the stamping of the zones would be rendered more difficult when the joint was to be already present in the work piece to be stamped. Likewise, a subsequent joining of components following the stamping would be difficult because of tolerances of the stamping process.

At least the first intermediate zone should form a ring about the core zone; preferably, the edge zone also extends about the intermediate zone as ring. The edge zone and the core zone can include surface normals that are parallel to the surface normal of the first intermediate zone.

A metal sheet, which is used for a floor panel of a motor vehicle body, should have a thickness between 0.5 mm and 1.0 mm, preferably between 0.6 mm and 0.7 mm. In such a metal sheet, a bead with a deflection of up to 6 mm can be generally stamped without risk of tearing, which is why the deflection of the steps of the body component according to the present disclosure should not be greater.

Stamping the intermediate zone according to the present disclosure between core and edge zone of the body component is consequently beneficial when the deflection between edge zone and core zone is to be significantly greater than these 6 mm, in particular greater than 8 mm.

In order to effectively protect against the tearing, the intermediate zone should not be too narrow; preferably, its width should at least correspond to the deflection between the intermediate zone and an adjacent zone.

In order to realize large deflections between edge zone and core zone, at least one second intermediate zone can be provided between the first intermediate zone and the core zone. In this way, deflections of 12 mm and above can be achieved.

The body component according to the present disclosure can be arranged on any boundary surface of a passenger cell, and preferably it forms a floor panel of the passenger cell since the same on the one hand is typically greatly coupled via side members to the vibrations of the engine and on the other hand has large surfaces which, when excited enter vibrations, can efficiently radiate sound into the passenger cell.

At least the core zone of the body component can be unconnected to other body components of the vehicle, on the one hand in order to avoid a direct vibration excitation of the core zone through touching body modules, on the other hand because tolerances during the stamping of the different zones of the body component render a connection of the adjoining component with different zones of the body component according to the present disclosure elaborate.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
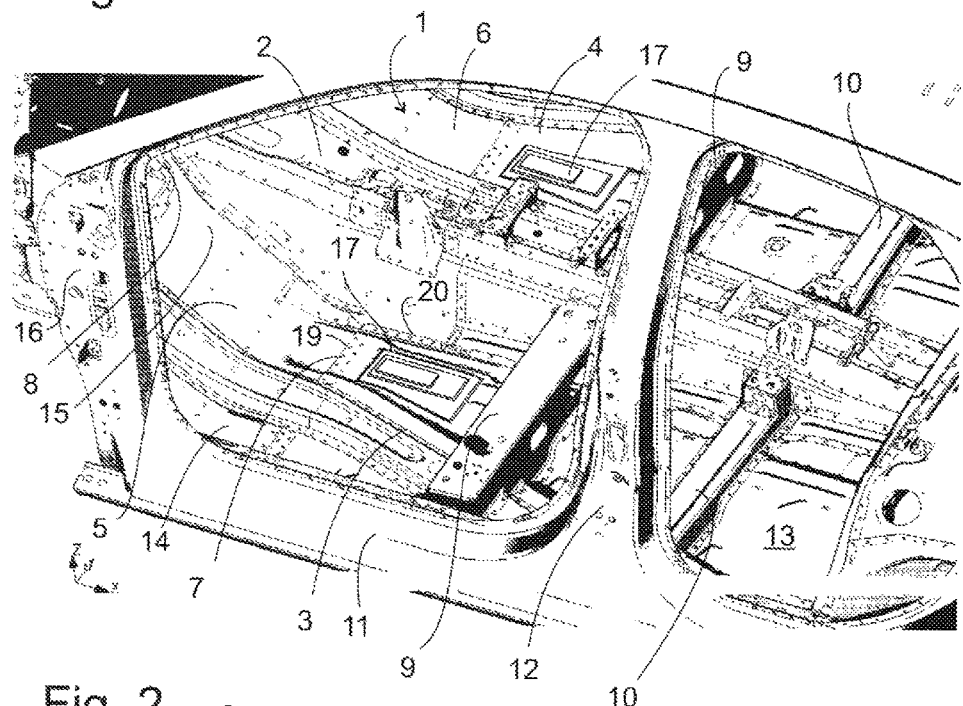
FIG. 1 is an extract from a motor vehicle body according to the present disclosure.

FIG. 1 shows a view through a driver's door opening 1 into a body in white of a vehicle body according to the present disclosure. A transmission tunnel 2 divides the floor of the passenger cell into a driver side region and a front passenger side region. Both regions in this case are composed of a plurality of plate shaped components, among these in each case one, designated in the figure with 3 and 4 respectively, with a substantially horizontal installation position and one, designated with 5 and 6 respectively, which is fastened on its horizontal rear edge to the horizontal component 3 and 4 respectively via a row 7 of spot welds extending in vehicle transverse direction and which obliquely rises towards the front to a front wall 8.

Two cross members 9, 10 extend in each case from a door sill 11 or the foot of a B-pillar 12 to the transmission tunnel 2. The components 3, 4 can in each case extend in one piece under the cross members 9, 10 as far as to a foot well 13 of a rear seat row.

The components 5, 6 are cylindrically curved in zones 14, 15 with greater curvature radius in order to form a continuous transition between their horizontal rear edge and the front wall 8; since these cylindrically curved zones 14, 15 are welded at their lateral ends to the transmission tunnel 2 and a side wall 16 of the body, the components 5, 6 are too stiff in order to be excited into resonance vibrations by the operation of the engine of the vehicle. The components 3, 4 do not have such extended, evenly curved stiffening zones. However, in order to nevertheless stiffen the components 3, 4 so far that their resonance frequencies lie at least largely beyond the operating vibration spectrum of the engine, a zone structure 17 each is stamped into the components 3, 4, which will be initially explained by way of the representation of FIG. 2.

Figure 2:
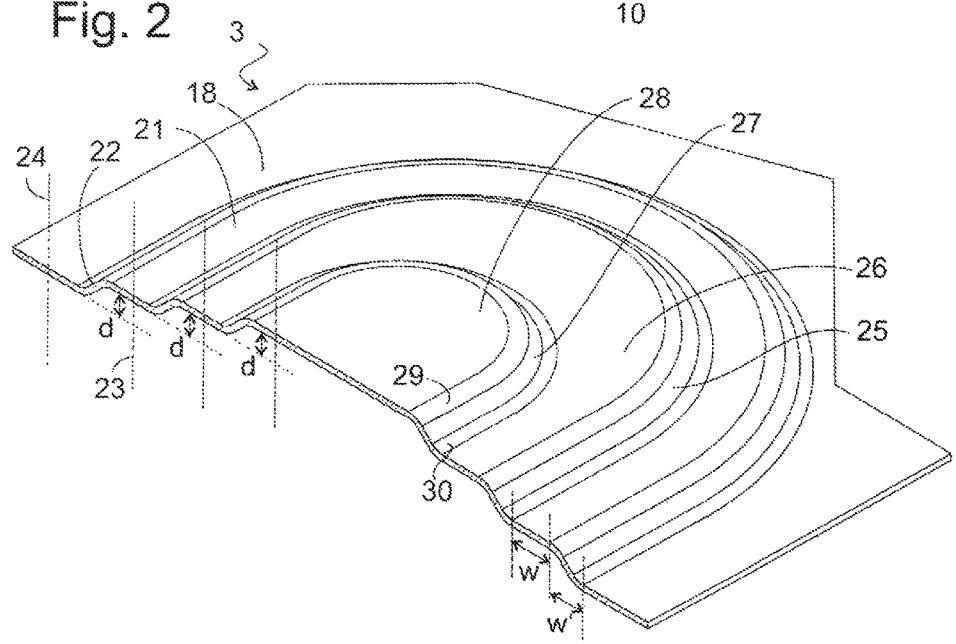
FIG. 2 are zones of a body component according to the present disclosure in a sectioned perspective view.

FIG. 2 shows in a perspective view a body component 3 of sheet steel, the construction of which is slightly simplified here in order to be able to better emphasise the particularities of the zone structure 17. An edge zone 18 of the zone structure 17 can simultaneously form an edge of the component 3, on the outer edges 19, 20 of which (see FIG. 1) other body components such as for example the transmission tunnel 2 or the component 5 are welded, but it can also be separated from these other body components but also by further steps, channels or other structures of the component 3 which are not shown in FIG. 2. The designation of the edge zone 18 merely points out that it forms the edge of the abovementioned zone structure 17.

A first planar intermediate zone 21 is separated from the edge zone 18 by a step 22. On the cut edge, a surface normal 23 of the intermediate zone 21 is drawn; a surface normal 24 of the edge zone 18 is parallel to the surface normal 23. The height measured in the direction of this surface normal 23, 24 or deflection d of the step 22 amounts to several mm, maximally 6 mm with a wall thickness of the component 3 of 0.65 mm.

A further step 25 separates the intermediate zone 21 from a further intermediate zone 26, and yet another step 27 extends between the intermediate zone 26 and a core zone 28. The intermediate zone 26 and the core zone 28 in turn have surface normals which are parallel to the surface normals 23, 24. The deflection (d) can be the same for all steps 22, 25, 27.

Each step 22, 25, 27 includes, as shown on the example of step 27 in FIG. 2, two sections 29, 30 which are each curved in section in opposite direction, which in each case extend uninterruptedly about the zone 21, 26 and 28 respectively surrounded by the step. The curvature radius of the sections 29, 30 lies in the same order of magnitude as the deflection d, i.e. a few millimetres. The zones 21, 26, 28 which for the sake of simplicity are entirely shown without curvature in FIG. 2 can in practice also have a finite curvature radius, but the same amounts to a multiple of the curvature radius of the sections 29, 30, typically several 10 cm, so that the steps 22, 25, 27 between the zones 21, 26, 28 are clearly noticeable over their entire length.

The number of the intermediate zones of a zone structure is variable in the individual case and on the one hand depends on the offset between edge and core zone required for a desired stiffening of the body component 3 and on the other hand on the available surface for the zone structure. The tearing tendency of the metal sheet is the greater the stiffer the steps are and the narrower the intermediate zones are. In the example of FIG. 2, the widths (w, w') both of the intermediate zones 21, 26 and also of the steps 22, 25, 27 are greater than the deflection (d).

Figure 3:
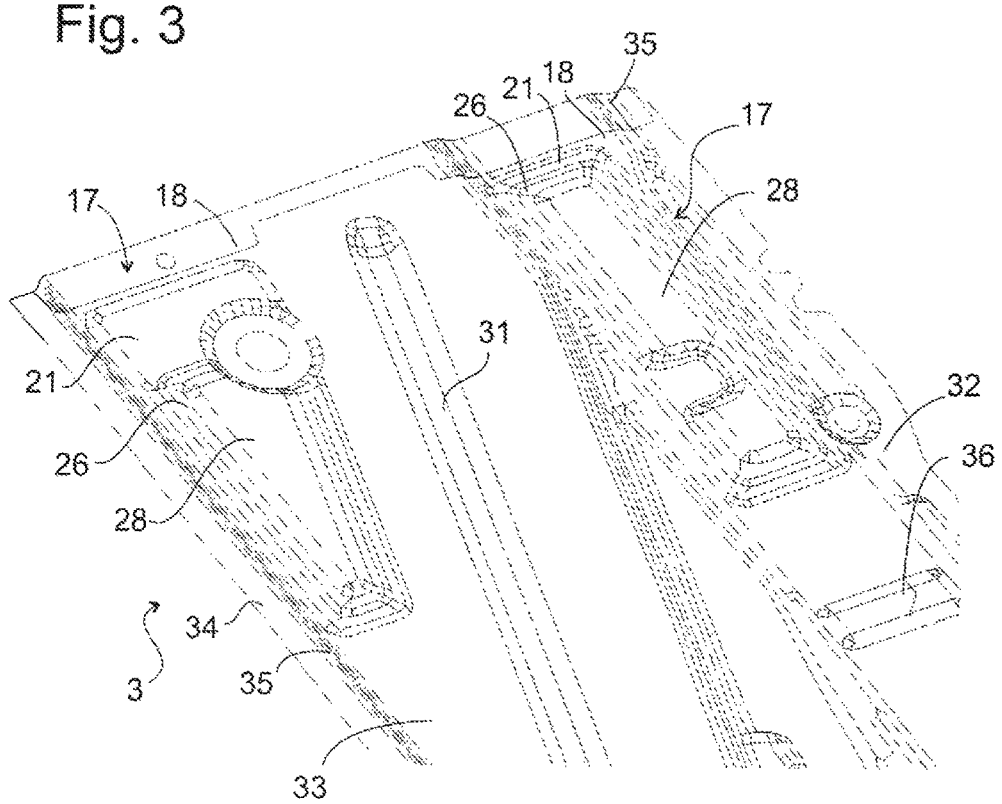
FIG. 3 is a floor panel according to the present disclosure.

FIG. 3 shows the front end of a floor panel as realistic example of a body component 3. A channel 31, which obliquely extends over the body component 3 as far as into the vicinity of its front outer edge 20, divides the body component 3 into a region facing the transmission tunnel and a region facing the side wall 32 and 33 respectively. The channel 31 can be provided for receiving a fuel line. Both regions 32, 33 are stiffened through a stamped-in zone structure 17 with edge zone 18, intermediate zones 21, 26 and core zone 28. The edge zones 18 reach as far as to the front outer edge 19 of the body component 3. The outer edge 20 facing the transmission tunnel 2 and an outer edge 34 facing the side wall 16 are offset against the edge zones 18 by a step 35 each. The intermediate zones 21, 26, and core zone 28 do not reach either the outer edges 19, 20 or the cross member 9, which is not shown in FIG. 3 but the installation position of which is noticeable by an elongated bulge 36 of the body component 3 in vehicle transverse direction, which in the body in white state of FIG. 1 engages into the cross member 9 from below.

None of the components which in the finished vehicle are connected to the body component 3 such as for example the component 5, the side wall, the transmission tunnel or the cross member 9 touch the intermediate zones 21, 26 and the core zone 28. Accordingly, they cannot on the one hand transmit their own vibrations directly to the core zone 28 while on the other hand the joined contours of the components remain simple so that along the welding zones, in which the components are connected to one another, the creation of sections, which cannot be brought into contact with one another required for welding, is avoided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A plate-shaped body component for a motor vehicle comprising a zone structure configured to stiffen the body component, the zone structure including a planar core zone forming a center of the zone structure, a planar edge zone forming an edge of the zone structure, and a first intermediate zone, which is set off from the core zone and from the edge zone by at least one step each, wherein the core zone and the edge zone are deflected against the first intermediate zone in opposite directions of a surface normal of the first intermediate zone, wherein the intermediate zone extends completely around the core zone and the edge zone extends completely around the intermediate zone.

2. The body component according to claim 1, wherein the body component comprises a one-piece stamped sheet metal part.

3. The body component according to claim 1, wherein the first intermediate zone forms a ring about the core zone, and the edge zone forms a ring around the intermediate zone so that the core zone and the intermediate zone do not reach the edge of the zone structure.

4. The body component according to claim 1, wherein the edge zone and the core zone have surface normals which are parallel to the surface normal of the first intermediate zone.

5. The body component according to claim 1, wherein the body component has a wall thickness between 0.5 mm and 1 mm.

6. The body component according to claim 4, wherein each step has a maximum deflection (d) of 6 mm.

7. The body component according to claim 4, wherein the entire deflection between edge zone and core zone amounts to at least 8 mm.

8. The body component according to claim 1, wherein which the width (w) of the intermediate zone is at least as great as the deflection (d) between the intermediate zone and the core zone.

9. The body component according to claim 1, wherein a second intermediate zone extends between the first intermediate zone and the core zone.

10. The body component according to claim 9, wherein the entire deflection between the edge zone and the core zone amounts to a maximum of 12 mm.

11. The body component according to claim 1, wherein the motor vehicle has a front seat area foot well and a rear seat area foot well and wherein the body component forms a floor panel of a passenger cell and extends from the front seat area foot well to the rear seat area foot well.

12. A motor vehicle comprising a body component according to claim 1, wherein at least the core zone of the body component is unconnected to other body components of the motor vehicle.

13. The body component according to claim 11 wherein the motor vehicle includes a transmission tunnel, a door sill and a cross member extending from the door sill to the transmission tunnel, wherein the body component extends under the cross member.

14. A body component for a motor vehicle that includes a transmission tunnel, a door sill, a front seat area foot well and a rear seat area foot well, the body component comprising a zone structure configured to stiffen the body component, the zone structure including a planar core zone forming a center of the zone structure, a planar edge zone forming an edge of the zone structure, and an intermediate zone connected between the core zone and the edge zone, the intermediate zone set off from the core zone and from the edge zone by at least one step each, wherein the core zone and the edge zone are deflected against the first intermediate zone in opposite directions of a surface normal of the first intermediate zone, wherein the body component extends in a first direction from the door sill to the transmission tunnel and extends in a second direction from the front seat area foot well to the rear seat area foot well.

15. The body component according to claim 14 wherein the edge zone connects directly with the transmission tunnel and with the door sill.

16. The body component according to claim 14 wherein the steps include curved sections that extend uninterruptedly around the core zone and around the intermediate zone.

17. The body component according to claim 14 wherein the motor vehicle includes a cross member extending from the door sill to the transmission tunnel, wherein the body component extends under the cross member.

18. The body component according to claim 14 comprising an elongated bulge extending in a vehicle transverse direction, wherein the elongated bulge engages into the cross member from below.

* * * * *